July 3, 1934.  A. GILSTAD  1,965,285
CONVEYER CHAIN
Filed May 16, 1931
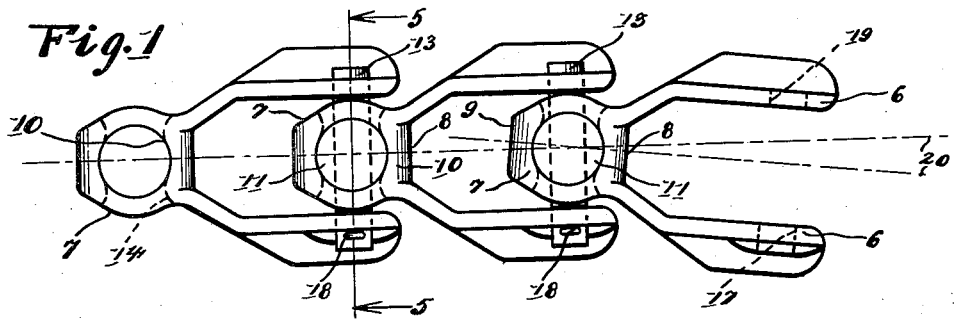
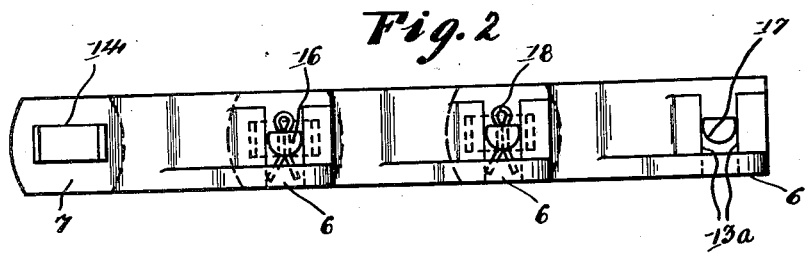
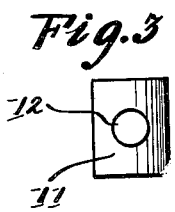
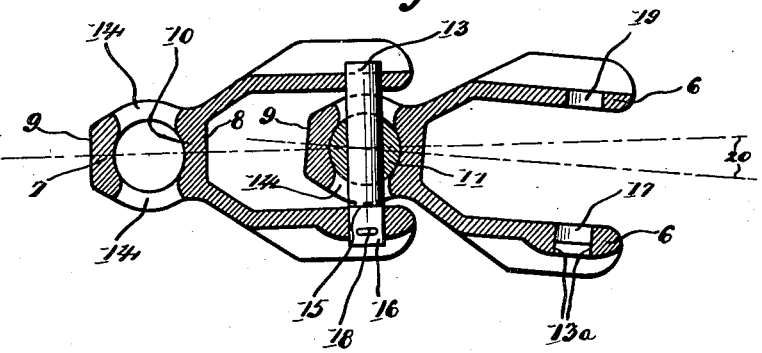
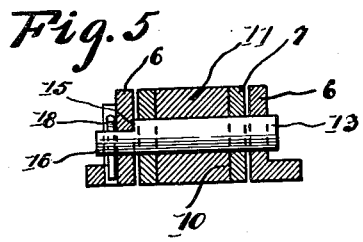
Inventor
Arthur Gilstad
By Stryker & Stryker
Attorneys Patented July 3, 1934

1,965,285

UNITED STATES PATENT OFFICE 1,965,285

CONVEYER CHAIN

Arthur Gilstad, St. Paul, Minn.

Application May 16, 1931, Serial No. 537,805

4 Claims. (Cl. 74—246)

This invention relates to a conveyer chain, and particularly, to a joint for a chain adapted to permit flexing of the chain both around sprocket wheels and in planes perpendicular to the faces of the sprocket wheels.

It is my object to provide a chain of this "double flex" type having novel and unusually strong, durable and inexpensive connections between links.

More particularly, it is my object to provide a chain with a novel arrangement of straight cylindrical members or pins extending perpendicular to each other at each joint, both of said members having ample bearing surfaces adapted to be machined at small expense to eliminate undesirable looseness and at the same time reduce wear and friction.

A further object is to provide a chain of this kind adapted for use under adverse conditions, such as where washing of the conveyer is necessary and where dirt and liquids are allowed to fall on the chain, the connections between links being designed to permit the ready escape of loose foreign matter, liquids and the like from the bearing surfaces.

Another object is to provide a joint of the double-flex type adapted to permit unusually abrupt bending in planes perpendicular to each other and at the same time to provide ample bearing surfaces of the desired cylindrical form.

The invention will be best understood by reference to the accompanying drawing in which:

Figure 1 is a plan view of a short section of my improved chain;

Fig. 2 is a side elevation of the same;

Fig. 3 is a detail showing one of the cylindrical swivel heads;

Fig. 4 is a horizontal section through a pair of links showing one of the joints, and Fig. 5 is a transverse section taken on the line 5—5 of Fig. 1.

The chain comprises a series of similar links each formed with a pair of spaced arms 6 to receive a bearing member 7 of the adjacent link between them. The teeth of sprocket wheels for supporting and driving the chain project between the arms 6 of each pair, end surfaces 8 and 9 being formed on each link for driving engagement with the teeth of the sprocket wheels.

The bearing portion 7 of each link has a large cylindrical bearing surface 10 to embrace a swivel head 11. Machined surfaces may be readily formed on said head to fit a similarly formed surface 10 where close fitting, smooth bearings are desired. Intersecting the axis of rotation of the head 11 and extending perpendicularly thereto is an opening 12 in the head 11 for a pivot pin 13. Elongated slots 14 extend through opposite sides of the bearing portion 7 and intersect the surface 10 to receive the pin 13. One end of the pin 13 has a flattened, peripheral surface 16 formed thereon. This end of the pin fits in a non-circular opening 17 in an arm 6, as best shown in Fig. 2, to prevent rotation of the pin relative to the arms 6. A shoulder 15, at an end of the surface 16, abuts against the inner surface of one of the arms 6 to prevent longitudinal withdrawal of the pin in one direction, a cotter key 18 being inserted in a perforation in the pin 13 to fasten it against longitudinal movement in the opposite direction. One end of the pin 13 merely fits in a circular opening 19 in one of the arms 6 and the pin may be inserted from the opening 19 successively through one of the slots 14, opening 12, other slot 14 and opening 17.

It will be noted that the pin 13 engages the relatively large swivel head 11 in the cylindrical opening 12 extending with its axis perpendicular to the axis of rotation of the head 11. The contacting surfaces of the pin 13 and head 11 may be machined if a close, smooth swivel fit is desired. Thus flexing of the chain about the axes of the pins 13 is permitted and also about the axes of the heads 11 extending perpendicular to the axes of the pins 13. The heads 11 are readily removable, being held in place by the pins 13 which may be quickly and easily removed after removing the cotter keys 18. Without unduly weakening the large bearing portions 7 of the chain, the slots 14 may be elongated to permit flexing of one link relative to the adjacent link, about the axis of the head 11, a very substantial angle, as indicated by the center lines 20 of the two links shown in Fig. 1.

For some purposes, I prefer to substitute rivets for the pins 13 and to secure the rivets against rotation by forcing the heads of the same between parallel lugs 13a formed on the chain links.

It will be noted that longitudinal tension of the chain is always transmitted from one link to another through the large bearing surfaces afforded between the heads 11 and bearing members 7 and there is no tendency to bind or create objectionable friction when flexing about the axes of the heads 11 is necessary. This renders the chain unusually durable and strong.

Chains of the type described herein are particularly well adapted for use in connection with creamery conveyers where liquids are frequently spilled on the chain and periodic washing of the conveyers is required. In such conveyers the axes of the heads 11 are usually disposed vertically so that the liquids and loose particles of solid matter escape from the open bottom of the large bearing surfaces between the heads 11 and members 7.

The invention is also adapted for overhead chain conveyer systems and for numerous other uses which will be obvious to those skilled in the art to which the invention pertains.

Having described my invention, what I claim as new and desire to protect by Letters Patent is:

1. A sprocket chain formed of articulated pin-connected links, each link having a sprocket-engaging head the opposite front and rear faces of which are shaped for direct working engagement with the teeth of sprocket wheels upon which the chain is used, and integral parallel side bars pierced near one end of the link to receive a link-connecting pin, said head being formed with an arcuate bearing centrally disposed relative to the side bars, perpendicular to said end piercing and having slots parallel to said piercing to receive a link-connecting pin, and an arcuate head pivotally mounted in said bearing, pierced in line with said slots and seating a link-connecting pin passing therethrough, to freely permit limited lateral movement of the links in the chain relative to each other.

2. A sprocket chain formed of articulated, pin-connected links, each link characterized by a sprocket-engaging head the opposite front and rear faces of which are shaped for direct working engagement with the teeth of sprocket wheels upon which the chain is used, and parallel side bars, integral with the head, said bars being pierced near one end of the link to receive a link-connecting pin, said head being formed with an annular, internal bearing perpendicular to said piercing and said head having slotted apertures through the side walls thereof parallel to said piercing and a swivel head seated in said bearing, pierced in line with said slotted apertures to receive a link-connecting pin passing through said slotted apertures and thereby permit restricted lateral movements of the links in the chain relative to each other.

3. A sprocket chain formed of articulated, pin-connected links, each link having at one end a sprocket-engaging head formed with opposite outer front and rear surfaces for direct engagement with the teeth of sprocket wheels and a pair of parallel side bars integral with said head and arranged to embrace the teeth of sprocket wheels, said bars being pierced near one end of the link to receive a link connecting pin, said head being formed with an internal, cylindrical bearing perpendicular to said piercing of said side bars and said head having apertures extending through the side walls thereof in parallel relation to said piercing, said apertures being elongated longitudinally of the chain and a cylindrical swivel head seated in said bearing and pierced in registry with said apertures to receive a link-connecting pin passing through said slotted apertures.

4. A sprocket chain formed of pin-connected links each link having parallel side bars which are united at one end by a coupling head adapted to lie between the separated ends of the side bars of another link, the opposite front and rear faces of such coupling head being shaped for direct working engagement with the teeth of the sprocket wheels upon which the chain is used, and the top face of the head being in approximately the plane of the top edges of the side bars, whereby the upper surface of the chain is adapted to support articles to be transported, there being formed through the said head a vertical cylindrical opening of relatively large size, located mid-way between the faces with which the sprocket teeth engage, a cylindrical plug at each coupling head seated in the said opening therein with its upper end substantially flush with the top face of the head and cylindrical coupling pins connecting the chain links, each pin seated at its ends in the separated side bars of one link and passing through a close fitting aperture in the cylindrical plug seated in the head of the adjacent coupled link, the walls of the coupling head between the side bars and the cylindrical plug being slotted where the connecting pin passes to permit articulation of the chain at its connected joints about the said cylindrical plugs.

ARTHUR GILSTAD.